United States Patent Office 3,272,856
Patented Sept. 13, 1966

---

3,272,856
PREPARATION OF HALO AND ALKYL-THIO
SUBSTITUTED ALLYL ESTERS
John B. Braunwarth, Crystal Lake, Ill., assignor, by mesne assignments, to Union Oil Company of California, Los Angeles, Calif., a corporation of California
No Drawing. Filed Dec. 30, 1963, Ser. No. 334,628
20 Claims. (Cl. 260—488)

This invention relates to allyl esters and a method of preparing same by the reaction of hydrofuran hydroperoxides with polyhalomethanes, halogens, hydrogen halides or certain mercaptans under redox conditions. The compounds of this invention are useful as chemical intermediates in organic synthesis to form various compounds, including those functioning as plasticizers and compounds which are resins and can be used in coatings and the like.

Many reactions of hydroperoxides are known in the prior art. E. G. E. Hawkins in his article entitled, "Reactions of Organic Peroxides, Part II, Reactions of α,α-Dimethylbenzyl Hydroperoxide ('Iso-Propylbenzene Hydroperoxide')," (J. Chem. Soc. 1950, 2169), shows the decomposition of α,α-dimethylbenzyl hydroperoxide by ferrous sulfate under the influence of various catalysts and under thermal conditions to form mixtures of 2-phenylpropan-2-ol, acetophenone and α-methylstyrene. The hydroperoxides were first shown by Hock and Lang, Ber. 77,257 (1944), to be formed by the oxidation of isopropylbenzene with air to give $Ph\text{-}CMe_2OOH$. Improved methods for their preparation are described by Armstrong, Hall and Quin, British Patents 610,293 and 630,286; J. Chem. Soc. 1950, 666. E. G. E. Hawkins and P. P. Young (J. Chem. Soc. 1950, 2804), state that the reaction of methylcyclopentyl hydroperoxide with ferrous sulfate solution gives rise to the formation of dodecane-2,11-dione. However, the use of methylcyclohexyl hydroperoxide gives poorer yields of tetradecane-2,13-dione. N. Brown et al., J. Am. Chem. Soc. 77, 1756 (1955), describe the preparation of "cyclohexanone peroxide" by the autocatalyzed, liquid phase oxidation of cyclohexanol with oxygen. Reaction of these peroxides with the ferrous ion in hydrocarbon solution is said by Brown et al. to produce a 68% yield of 1,12-dodecanedioic acid.

M. S. Kharash and W. Nudenberg in their article entitled, "Detection of Free Radicals in Solution, III, Formation of Long-Chain, α,ω-Dicarboxylic Acids" (J. Org. Chem. 19, 1921 (1954)), indicate that unsaturated dicarboxylic acids of 20 carbon atoms are formed from cyclohexanone peroxide and butadiene.

The formation of diketones and dibasic acids is assumed to take place by the rearrangement of an alkoxy radical to an open-chain carbon radical, followed by dimerization, thus:

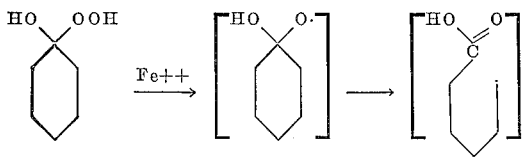

In the case of the $C_{20}$ dicarboxylic acids, the intermediate radical adds to the butadiene before dimerization.

In U.S. Patent 2,905,712, by Gifford W. Crosby and the instant inventor, there is disclosed the reaction of cyclic peroxides such as cyclohexanone peroxide with polyhalomethane compounds under redox conditions to form omega-halogen-substituted acids or ketones. These products are derived from only one peroxide molecule and no dimerization takes place in the reaction. The acid and ketone products have one more carbon atom than is present in the original alicyclic compounds, with terminal trihalosubstitution.

In accordance with this invention I have found that by using hydrofuran hydroperoxides of the formula (I) 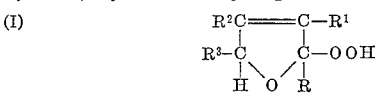

wherein R, $R^1$, $R^2$ and $R^3$ are any substituent which does not interfere with the reaction, including hydrogen or alkyl groups having straight or branch chain configuration and containing 1 to 5 carbon atoms, in place of the alicyclic hydroperoxides of U.S. Patent 2,905,712, the products are compounds of formula (II) 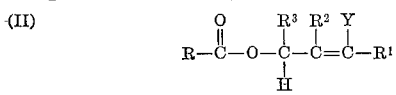

wherein Y is Cl, Br, I, $-CX_3$ wherein X is halogen, or $-SR^4$, wherein $R^4$ is a $C_1$–$C_5$, straight or branched chain alkyl group.

The reaction of this invention is illustrated by treating 2-methyl-2,5-dihydrofuran-2-hydroperoxide with bromotrichloromethane under redox conditions to form 3-bromopropenyl-2-acetate as illustrated by the following equation:

(III)
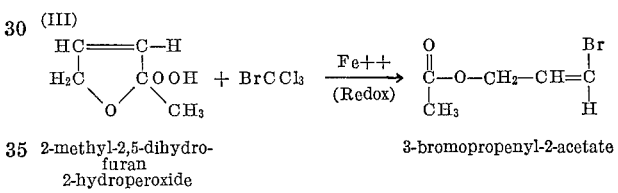

2-methyl-2,5-dihydro-  3-bromopropenyl-2-acetate
furan
2-hydroperoxide

The free radicals, $[-CCl_3]$, combine to form hexachloroethane, an easily separated by-product. The same reaction occurs when chlorine, bromine, iodine or a hydrogen halide (except HF) is used in place of the bromotrichloromethane with a corresponding change of the bromine at the end product to the particular halogen employed. Any free hydrogen is consumed by the ferric sulfate. With carbon tetrachloride the reaction proceeds to form two ester products as follows:

(IV)
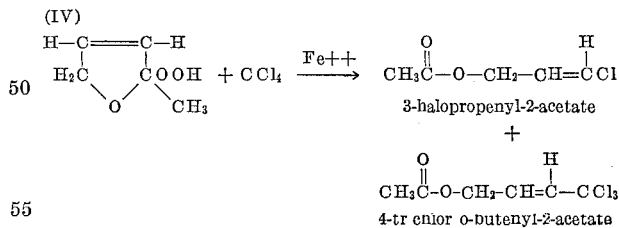

The products are readily separated from the reaction mixture and from each other by distillation.

When a mercaptan is used as the reactant the process proceeds in accordance with the following equation:

(V)
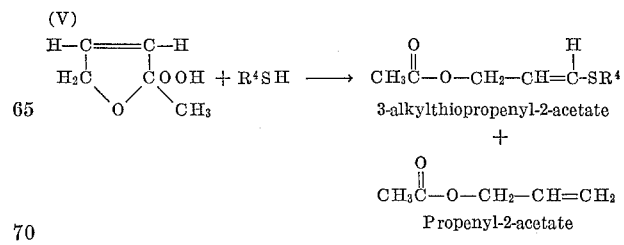

2,5-dihydrofuran hydroperoxide can be substituted for 2-methyl-2,5-dihydrofuran-2-hydroperoxide to form the formic acid esters. Other hydroperoxides as disclosed herein can be used to form esters of higher molecular weight allyl type alcohols as will be demonstrated.

Accordingly it becomes a primary object of this invention to provide a new method of preparing allyl esters.

Another object of this invention is to provide a method of preparing allyl esters of formic, acetic, propionic, n-butyric, isobutyric, n-valeric, trimethylacetic, and caproic acid and the like.

An object of this invention is to provide a new method of preparing allyl esters using the redox reaction.

Another object of this invention is to provide a method of producing allyl esters by the reaction of a furan compound with an oxidizing agent to form the hydroperoxide, and reacting the hydroperoxide with a selected halogen compound or mercaptan under redox conditions.

Another object of this invention is to provide a method of producing compounds of Formula II as herein defined.

Another object of this invention is to provide a process for the preparation of acetic acid esters.

A still further object is to provide compounds of Formula I as new compounds.

These and other objects of this invention will be described or become apparent as the specification proceeds.

The furan peroxide starting materials for the reaction of this invention are preferably prepared immediately before the reaction because these compounds are slightly unstable. The techniques described in the preparation of hydroperoxide as set forth in U.S. Patent 2,905,712 can be used to prepare the starting materials of this invention. The term "furan peroxide" as used herein is intended to mean compounds of Formula I and includes compounds which, in the strict sense, are defined as hydroperoxides. Illustrative starting materials include the following 2-hydroperoxides:

2,5-dihydrofuran hydroperoxide
2-methyl-2,5-dihydrofuran hydroperoxide
2-ethyl-2,5-dihydrofuran hydroperoxide
2-propyl-2,5-dihydrofuran hydroperoxide
2-butyl-2,5-dihydrofuran hydroperoxide
2-isobutyl-2,5-dihydrofuran hydroperoxide
2-t-butyl-2,5-dihydrofuran hydroperoxide
2-amyl-2,5-dihydrofuran hydroperoxide
2-isoamyl-2,5-dihydrofuran hydroperoxide
2,5-dimethyl-2,5-dihydrofuran hydroperoxide
2,5-diethyl-2,5-dihydrofuran hydroperoxide
2-methyl-5-ethyl-2,5-dihydrofuran hydroperoxide
2,5-dipropyl-2,5-dihydrofuran hydroperoxide
2-ethyl-5-methyl-2,5-dihydrofuran hydroperoxide
2-methyl-5-propyl-2,5-dihydrofuran hydroperoxide
2-propyl-5-methyl-2,5-dihydrofuran hydroperoxide
2,5-dibutyl-2,5-dihydrofuran hydroperoxide
2,5-di-t-butyl-2,5-dihydrofuran hydroperoxide
2,5-diamyl-2,5-dihydrofuran hydroperoxide
2-methyl-5-butyl-2,5-dihydrofuran hydroperoxide
2,3,4,5-tetramethyl-2-hydrofuran hydroperoxide
2,3,4,5-tetraethyl-2-hydrofuran hydroperoxide The second reactant for the process of this invention consists of known and readily available compounds falling into the classes of polyhalomethanes, hydrogen halides, the halides, and certain mercaptans.

The polyhalomethanes used as reactants in this invention may be represented by the formula $$CH_nX_{4-n}$$

where X is a halogen of the group consisting of chlorine, bromine and iodine, combinations thereof, and fluorine when at least one of the other halogens is present in the molecule and $n$ is 0 or 1. Examples are carbon tetrachloride, carbon tetraiodide, carbon tetrabromide, chloroform, iodoform, bromoform, bromotrichloromethane, iodotrichloromethane, and the like.

The halogens included as reactants are chlorine, bromine and iodine and the corresponding hydrohalides, i.e., hydrogen chloride, hydrogen bromide and hydrogen iodide. The mercaptan reactant has the formula $R^4SH$  wherein $R^4$ is a $C_1$ to $C_5$ straight or branched chain alkyl group, such compounds being represented by the group consisting of methyl mercaptan, propyl mercaptan, ethyl mercaptan, isopropyl mercaptan, butyl mercaptan, isobutyl mercaptan, t-butyl mercaptan, amyl mercaptan and isoamyl mercaptan.

The reactions of this invention are specifically illustrated by the foregoing equations wherein the reaction medium will consist in an aqueous methanol solution of ferrous sulfate. The products of the reaction are found in the organic phase in the form of the esters.

The use of reduction-oxidation conditions is essential to convert the peroxide compounds to the omega-halogen-substituted aliphatic acids. The term "redox" is used herein in its widely accepted sense to designate a reduction-oxidation system wherein an electron transfer takes place with the simultaneous formation of a free radical. In order for this transfer to take place, it is necessary that there be present a substance or substances which acts as a reducing agent for the peroxide compound. Those heavy metals which are capable of existing in several valence states such as iron, chromium, manganese, cobalt, copper and molybdenum are suitable reducing agents in their lower valence states. Certain organic and inorganic compounds may also be used such as sodium bisulfite, the reducing sugars, 1-ascorbic acid, sodium formaldehyde sulfoxylate and other reducing agents used in the redox art. Sulfuric acid can be replaced with other mineral acids or strong organic acids.

The invention will be illustrated by the use of the ferrous ion, but is not to be limited thereby, in general, when using a heavy metal such as ferrous ion, the amount of ion is equivalent to, or in excess of, the amount of peroxide to be reacted. The heavy metal ions also may be used in trace amounts as promoters with any one of the aforementioned reducing agents which serve to convert the ferric ion to the ferrous ion as fast as the ferric ion is produced. Because of low cost, availability and efficiency, the ferrous ion is preferred for the reaction. Since this reaction does not involve dimerization, it is not necessary to exclude oxygen from the reaction system.

The process of this invention can be carried out in various solvents such as water, ethanol, t-butanol, aromatics, ethers, esters, ketones, dioxane or other mixtures in the emulsion state. Pressures above or below atmospheric can be used. In general, pressures higher than atmospheric pressure are advantageous where a relatively volatile solvent is used in the liquid phase. At atmospheric pressure the reaction proceeds at temperatures in the range of —100° C. to 100° C. The preferred temperature range is about —20° C. to about 60° C. It is preferable that the reaction be carried out in a solvent which is common for both the peroxide compound and the halogen compound and the reducing agent, since thereby rapid intermixture of reactants is made possible, with the result that side reactions are minimized when the ferrous ion is used as the reducing agent. Methanol is the preferred common solvent. Where water-soluble ferrous salts are used as the reducing agent, the reaction may be carried out in an aqueous alcoholic medium in which contact between the two liquid phases is maintained by agitation. In conducting the reaction in the emulsion state using immiscible but selective solvents for the peroxide and halogen reactant, the use of a dispersing agent brings about better intermixing.

The reaction of this invention can be carried out in a batchwise or continuous manner. Some species of peroxide reactants are highly explosive and sensitive to shock. Accordingly, known precautions should be taken in handling these materials.

The allyl ester products of this invention may be separated from the reaction mixture by various means known in the art. The products may be recovered by distillation in the ester form or purified by solvent extraction. The ferric ion by-product of the reaction can be recovered by precipitation, ion-exchange, or by reduction and recycling to the process.

In order to demonstrate the invention the following examples are given.

EXAMPLE I

*Preparation of 3-bromopropenyl-2-acetate*

Into a 1 liter 3 necked round bottom flask was placed 50 cc. of anhydrous ether. After cooling to 0° C., 17.3 g. of 96% $H_2SO_4$ was added followed by the addition of 28.0 g. (0.36 mole) of 30% $H_2O_2$ and to this was added 20.5 g. (0.25 mole) of 2-methyl-furan over a period of 45 minutes. Stirring (at <0° C. temperature) was continued for one hour. The hydroperoxide mixture was then diluted with 250 cc. of methanol. To this mixture, still at 0° C., was added 69.5 g. (0.35 mole) of $BrCCl_3$, a ferrous salt solution, 106 g. (0.38 mole) $FeSO_4·H_2O$ and 150 cc. $H_2O$ was added dropwise. Mixture became a brilliant red for a few moments. During ferrous salt addition and thereafter the system was kept under nitrogen atmosphere. At end of reaction the hexachloroethane (43.2 g.) was removed by filtration. The allyl ester is stable only in absence of air; no stabilizer has yet been found to keep it stable in air. In air the allyl ester polymerizes to a dark black resin. The ester was identified as 3-bromopropenyl-2-acetate.

EXAMPLE II

The process of Example I is carried out using furan in place of 2-methyl-furan to produce 3-bromopropenyl-2-formate.

EXAMPLE III

The process of Example I is repeated using bromine in place of bromotrichloromethane to produce 3-bromopropenyl-2-acetate.

EXAMPLE IV

The process of Example I is carried out using methyl mercaptan in place of bromotrichloromethane to produce 3-methylthiopropenyl-2-acetate.

EXAMPLE V

The process of Example I is carried out using hydrogen chloride in place of bromotrichloromethane to produce 3-chloropropenyl-2-acetate.

EXAMPLE VI

The process of Example I is carried out using n-amyl furan in place of 2-methyl-furan to produce 3-bromopropenyl-2-caproate and 3-trichlorobutenyl-2-caproate.

The process of this invention encompasses the reaction of a hydrofuran hydroperoxide compound and various alkyl derivatives thereof, with a reactant of the group consisting of polyhalomethanes, hydrogen halides (except hydrogen fluoride), aliphatic mercaptans and halogens (except fluorine) under redox conditions and separating the allyl ester product or products. Although carbon tetrachloride gives a mixed ester product, as does the use of a mercaptan in the reaction, these are readily separated because of their different molecular weights and boiling points in addition to their different solubilities. Under redox conditions the hydrogen released from the reaction with a hydrogen halide is consumed. A discussion of the theoretical aspects of the mechanism of this type of reaction is found in Jour. Org. Chem. 27, 2069, 1962.

The hydrofuran hydroperoxide starting materials are available commercially or readily prepared by known methods, as for example from diketones, through the following generalized reactions:

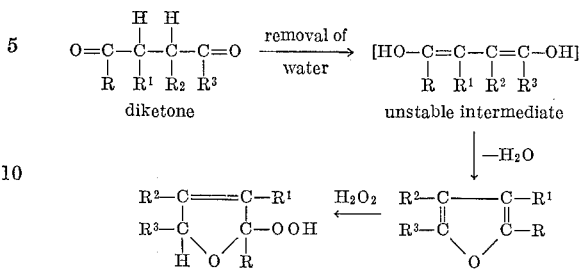

A feature of this invention is that R in the above equations can be hydrogen or the methyl, ethyl, n-propyl, isopropyl, n-butyl, isobutyl, sec-butyl, tertiary butyl, n-amyl, isoamyl or tertiary amyl group, whereby allyl esters of formic, acetic, propionic, butyric, valeric, trimethylacetic and caproic acids and the like are formed. Also variations in $R^1$, $R^2$ and $R^3$ form the basis for different allyl ester groups on these acids which are obvious to one skilled in the art. In certain cases the mixed ester products may be used as such without separation.

Additional examples of compounds obtainable by the process of this invention are 3-chloropropenyl-2-acetate
3-chloropropenyl-2-butyrate
3-chloropropenyl-2-trimethylacetate
4-trichlorobutenyl-2-acetate
4-trichlorobutenyl-2-formate
3-ethylthiopropenyl-2-acetate The embodiments of the invention in which an exclusive property or privilege is claimed as defined as follows:

1. The method which comprises reacting a peroxide compound of the formula

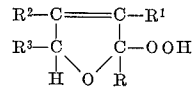

wherein R, $R^1$, $R^2$ and $R^3$ are substituents of the group consisting of hydrogen and $C_1$ to $C_5$ alkyl, with a reactant of the group consisting of polyhalomethane compounds of the formula $CH_nX_{4-n}$ wherein X is halogen of the group consisting of chlorine, bromine and iodine, combinations thereof and fluorine when at least one of the other halogens is present in the molecule and $n$ is an integer of 0 to 1, chlorine, bromine, iodine, hydrogen chloride, hydrogen bromide, hydrogen iodide and mercaptans of the formula $R^4SH$ wherein $R^4$ is $C_1$–$C_5$ alkyl, in the presence of redox reducing agent and separating allyl ester products fo the formula

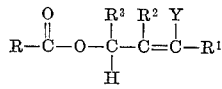

wherein R, $R^1$, $R^2$ and $R^3$ are as above defined and Y is a member of the group consisting of chlorine, bromine, iodine, the group —$CX_3$ wherein X is halogen and the group —$SR^4$ wherein $R^4$ is as above defined.

2. The method in accordance with claim 1 in which said redox reducing agent comprises a heavy metal ion capable of existing in several valence states and said reaction is conducted at a temperature of about −100° C. to 60° C. in the presence of a mutual solvent.

3. The method in accordance with claim 2 in which said heavy metal ion is at least one member of the group consisting of the ferrous ion, chromous ion, manganous ion, cobaltous ion, and the cuprous ion, same being obtained from the salts thereof.

4. The method in accordance with claim 3 in which said heavy metal ion is the ferrous ion.

5. The method in accordance with claim 1 in which said reactant is a polyhalomethane compound as therein defined.

6. The method in accordance with claim 5 in which said polyhalomethane compound is bromotrichloromethane.

7. The method in accordance with claim 1 in which $R^1$, $R^2$, $R^3$ and $R^4$ of said peroxide compound and ester product are hydrogen.

8. The method in accordance with claim 1 in which $R^1$, $R^2$ and $R^3$ of said peroxide compound and ester product are hydrogen and R is methyl.

9. The method in accordance with claim 1 in which $R^1$, $R^2$ and $R^3$ of said peroxide compound and ester product are hydrogen and R is $C_5$ alkyl.

10. The method of preparing 3-bromopropenyl-2-acetate which comprises reacting 2-methyl-furan with hydrogen peroxide in mineral acid solution to form 2-methyl-2,5-dehydrofuran-2-hydroperoxide at a temperature of about $-100°$ C. to $60°$ C. and reacting said hydroperoxide with bromotrichloromethane under redox reducing conditions in the presence of a mutual solvent and recovering 3-bromopropenyl-2-acetate as the primary product.

11. The method of preparing 3-bromopropenyl-2-formate which comprises reacting 2,5-dihydrofuran with hydrogen peroxide in mineral acid solution to form 2,5-dihydrofuran hydroperoxide at a temperature of about $-100°$ C. to $60°$ C. and reacting said hydroperoxide with bromotrichloromethane under redox reducing conditions in the presence of a mutual solvent and recovering 3-bromopropenyl-2-formate as the primary product.

12. Allyl esters of the formula

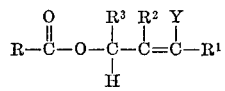

wherein R, $R^1$, $R^2$ and $R^3$ are substituents of the group consisting of hydrogen and $C_1$–$C_5$ alkyl, Y is a member of the group consisting of chlorine, bromine, iodine, the group —$CX_3$ wherein X is halogen and the group —$SR^4$ wherein $R^4$ is $C_1$–$C_5$ alkyl.

13. Allyl esters in accordance with claim 12 in which $R^1$, $R^2$, $R^3$ and $R^4$ are hydrogen.

14. Allyl esters in accordance with claim 12 in which $R^1$, $R^2$ and $R^3$ are hydrogen and $R^4$ is methyl.

15. 3-bromopropenyl-2-acetate.
16. 3-bromopropenyl-2-formate.
17. 3-methylthiopropenyl-2-acetate.
18. 3-bromopropenyl-2-caproate.
19. 4-trichlorobutenyl-2-acetate.
20. 3-chloropropenyl-2-acetate.

References Cited by the Examiner
UNITED STATES PATENTS

| | | | |
|---|---|---|---|
| 2,820,813 | 1/1958 | Smith | 260—488 X |
| 2,901,506 | 8/1959 | Bullock | 260—488 |
| 2,905,712 | 9/1959 | Braunwarth | 260—539 |
| 3,013,068 | 12/1961 | De La Mare | 260—488 |
| 3,079,429 | 2/1963 | Chafetz | 260—488 X |

LORRAINE A. WEINBERGER, *Primary Examiner.*

LEON ZITVER, *Examiner.*

D. P. CLARKE, V. GARNER, *Assistant Examiners.*